United States Patent [19]
Guenther et al.

[11] Patent Number: 5,446,547
[45] Date of Patent: Aug. 29, 1995

[54] COMBINATION OF MOTORIZED AND PIEZOELECTRIC TRANSLATION FOR LONG-RANGE VERTICAL SCANNING INTERFEROMETRY

[75] Inventors: Bryan W. Guenther; Paul J. Caber; John B. Hayes, all of Tucson, Ariz.

[73] Assignee: Wyko Corporation, Tucson, Ariz.

[21] Appl. No.: 235,105

[22] Filed: Apr. 29, 1994

Related U.S. Application Data

[63] Continuation-in-part of Ser. No. 143,372, Oct. 25, 1993, Pat. No. 5,355,221, which is a continuation of Ser. No. 880,083, May 6, 1992, Pat. No. 5,204,734, which is a continuation of Ser. No. 714,215, Jun. 12, 1991, Pat. No. 5,133,601.

[51] Int. Cl.⁶ .................................................. G01B 11/02
[52] U.S. Cl. .................................... 356/357; 356/359
[58] Field of Search ............................. 356/360, 357–359, 356/376, 381; 250/201.2, 201.3, 201.4, 201.5, 201.6, 201.7, 201.8

[56] References Cited

U.S. PATENT DOCUMENTS

| | | | |
|---|---|---|---|
| 4,083,056 | 4/1978 | Nakamura et al. | 250/201.8 |
| 4,512,642 | 4/1985 | Ito et al. | 250/201.3 |
| 4,686,359 | 8/1987 | Yokoi et al. | 250/201.3 |
| 4,869,593 | 9/1989 | Biegen | 356/359 |
| 5,204,734 | 4/1993 | Cohen | 356/359 |
| 5,233,201 | 8/1993 | Cheng | 356/376 |

Primary Examiner—Samuel A. Turner
Assistant Examiner—Jason D. Eisenberg
Attorney, Agent, or Firm—Antonio R. Durando

[57] ABSTRACT

A scanning interferometer that utilizes a DC gear motor instead of a PZT translator in closed-loop configuration with an LVTD position sensor. The DC motor is connected to the scanning mechanism so that a rotational motion of the motor shaft produces a translation along the optical axis of either the sample or the objective of the interferometer. During scanning, the motor is driven by the input of a ramp signal into the system. The closed-loop configuration is such that a constant, or nearly constant voltage is applied to the DC motor to produce a constant-speed scan in response to the ramp input. Any non-linearity in the speed of motion is corrected by an adjustment to the motor voltage. At the completion of the scan, the ramp input is removed and the motor is automatically returned to the starting position to satisfy the closed-loop condition. In order to maintain the image in focus on the sensor over the wide range of scanning, a pair of relay lenses is inserted in the optical path between the interferometer and the light detector.

36 Claims, 8 Drawing Sheets

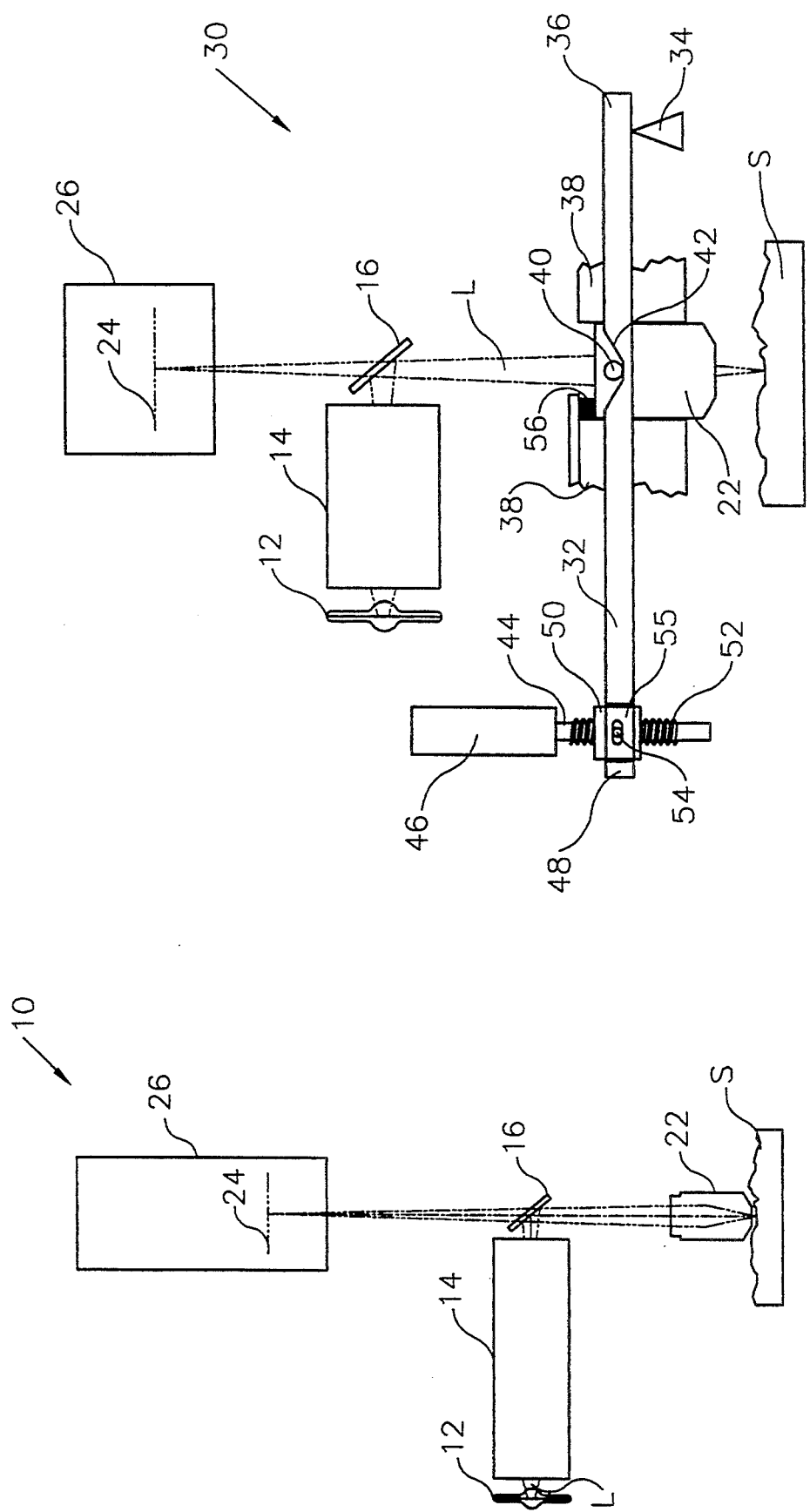

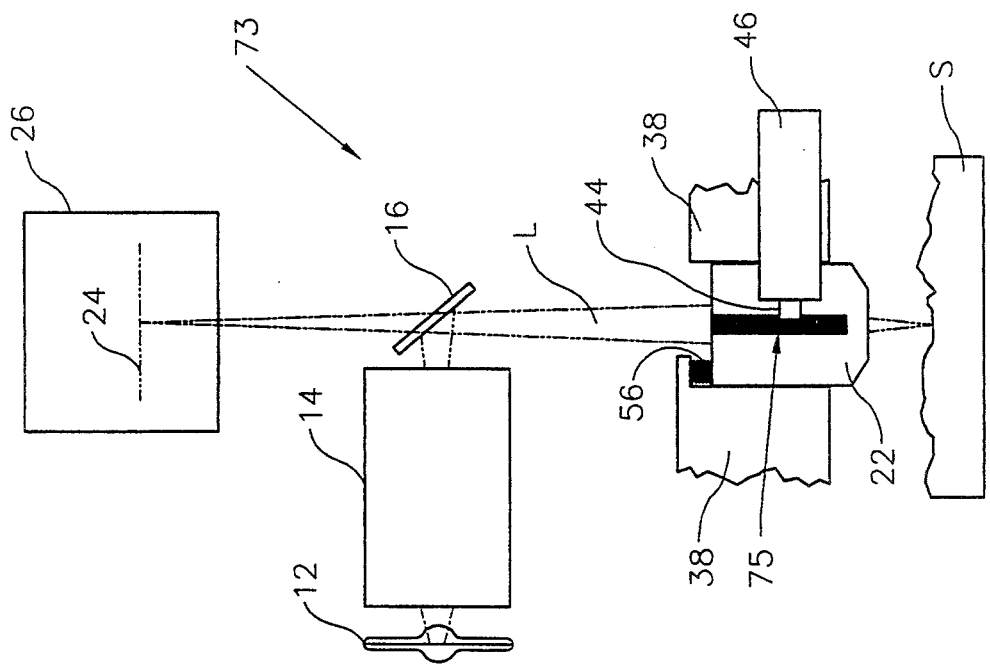
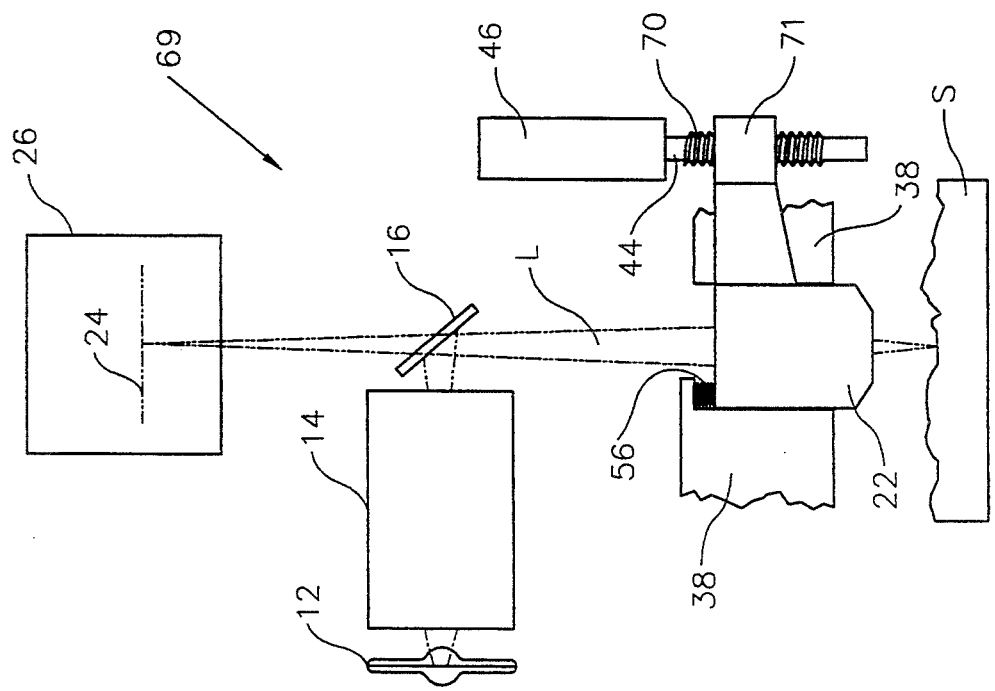
FIG. 6
FIG. 5

COMBINATION OF MOTORIZED AND PIEZOELECTRIC TRANSLATION FOR LONG-RANGE VERTICAL SCANNING INTERFEROMETRY

RELATED APPLICATIONS

This is a continuation-in-part application of U.S. Ser. No. 08/143,372, (issued as U.S. Pat. No. 5,355,221) filed on Oct. 25, 1993, which is a continuation application of U.S. Ser. No. 07/880,083 (issued as U.S. Pat. No. 5,204,734), which is a continuation application of U.S. Ser. No. 07/714,215 (issued as U.S. Pat. No. 5,133,601).

BACKGROUND OF THE INVENTION

1. Field of the Invention

This invention is related in general to the field of scanning interferometry and, in particular, to a motorized device for effecting the vertical scanning motion of a sample or of an optical microscope objective about a focal point.

2. Description of the Related Art

Vertical scanning interferometry (VSI) is a technique where white light is used as a source in an interferometer and the degree of fringe modulation, or coherence, of the interference fringes is measured for various distances between a test surface and the optics of the interferometer (each corresponding to a different optical path difference, OPD) to determine surface height. The method typically involves vertical scanning of the reference arm of the interferometer with respect to a stationary sample and calculation of the relative modulation of the intensity signal as a function of vertical position. VSI techniques have been used successfully in overcoming the limitations of surface height measurements encountered in conventional phase shifting interferometry.

As illustrated in simple schematic form in FIG. 1 and described in further detail in U.S. Pat. No. 5,204,734, herein incorporated by reference, typical vertical scanning interferometric equipment 10 comprises a white-light source 12 directing a beam L of white light through a conventional illuminator 14 toward a beam splitter 16, which reflects the light downward in the direction of a test surface S. The light reflected by the beam splitter 16 first passes through a microscope objective 22 focused on the test surface S, which incorporates an interferometer (such as Mirau) comprising a beam splitter and a reference mirror (housed in a reference arm not shown in the drawings), so that two light beams are generated for producing interference fringes as a result of the optical path difference between the reference mirror and the test surface S. Thus, as is well understood by those skilled in the art, the beams reflected from the reference mirror and the test surface S pass back up trough the microscope objective 22 and upward through the beam splitter 16 to a solid-state imaging array 24 positioned in a camera 26 in coaxial alignment with the objective 22. The imaging array 24 consists of individual charge-coupled-device (CCD) cells or other sensing apparatus adapted to record a two-dimensional array of signals corresponding to interference effects produced by the interferometer as a result of light reflected at individual x-y coordinates or pixels in the surface S and received at corresponding individual cells in the array. Appropriate electronic hardware (not shown) is provided to process the signals generated by each cell and transmit them to a computer for further processing. Thus, an interference-fringe map is generated by detecting the intensity of the light signal received in each cell of the array 24.

In vertical scanning interferometry, a profile of the surface S is produced by repeating the measurement at different, constant-interval distances between the objective 22 and the test surface S (that is, at different elevations of the scanning mechanism), so as to provide information concerning the variation of light intensity at each pixel as the corresponding optical path difference is varied systematically with respect to an initial reference point. Thus, the position of the scannning mechanism corresponding to maximum interference at each pixel is determined and used, based on the distance from the reference point, to calculate the height of the surface at that pixel. Therefore, either the objective 22 or the test surface S is moved vertically to produce these repeated measurements (vertical scanning). It is noted that the present description is based on the configuration of a Mirau interferometer but, as one skilled in the art would readily understand, it is equally applicable to any of the other instruments used in vertical scanning interferometry, such as Michelson, Linnik or Fizeau.

Interferometric scanning utilizes piezoelectric transducers (also known as PZT ceramics) to translate the sample or the reference arm in the interferometer (which is normally incorporated in the optical microscope objective), with respect to the fixed sensor. For white-light scanning interferometry, the scan range provided by PZT elements can be about 100 $\mu$m, while for conventional phase-shifting interferometry scanning is typically limited to a few wavelengths of light, or less than 1 $\mu$m. PZT translators are used because they provide very smooth motion with quick response over the small distances required for phase-shifting measurements and because they can be easily controlled by either closed-loop control techniques (such a by linear-variable-differential-transformer position sensing—LVDT) or by open-loop configurations.

One of the major disadvantages of PZT translators, though, is their limited range of operation, typically within 100 $\mu$m, which greatly limits the application of vertical scanning techniques for profiling rough surfaces. Another drawback is the hysteresis effects inherent in the cyclical electromechanical operation of the PZT material, which requires closed-loop feedback or sophisticated control algorithms to ensure consistency of measurements. A third problem is the nonlinear response of piezoelectric elements to applied voltages, which also requires corrective control schemes to obtain reliable measurements. Finally, other disadvantages of piezoelectric transducers are high cost, high operating voltages (in the order of 100 or more volts), and the very delicate handling that they require.

As vertical scanning interferometry becomes a preferred method for measuring surface heights, a need has developed for instruments capable of scanning greater distances than PZT translators are able to cover. In addition, as greater scanning distances are spanned, the linearity of the scanning mechanism becomes more important in order to minimize the need for corrective measures. Therefore, this invention is directed at providing a broader-range, preferably linear scanning mechanism to increase the range of operation of white-light vertical scanning interferometry.

BRIEF SUMMARY OF THE INVENTION

One primary objective of this invention is a vertical scanning approach that is usefully operable over a larger distance than available with conventional PZT translators, preferably over a range greater than 500 microns.

Another important goal of the invention is a method and apparatus that enable vertical scanning with no hysteresis effects.

Yet another goal is a method and apparatus that ensure scanning with minimal effects from nonlinearity of response of the scanning element.

Another objective of the invention is a mechanism that is operable at relatively low voltage.

Still another objective is a scanner of relatively rugged construction that does not require the high degree of care that is necessary while handling piezoelectric transducers.

A final objective is a design for a VSI instrument that can be implemented easily and economically according to the above stated criteria.

Therefore, according to these and other objectives, the present invention consists of an interferometer that utilizes a DC gear motor instead of a PZT translator in closed-loop configuration with an LVDT position sensor. The DC motor is connected to the scanning mechanism so that a rotational motion of the motor output-shaft produces a translation along the optical axis of either the sample or the optical objective of the interferometer. During scanning, the motor is driven by the input of a ramp signal into the system. The closed-loop feedback configuration is such that a constant, or nearly constant voltage is applied to the DC motor to produce a linear (constant speed) scan in response to the ramp input. Any non-linearity in the motion is corrected by an adjustment to the motor voltage. At the completion of the scan, the ramp input is removed and the motor is automatically returned to the starting position to satisfy the closed-loop condition. In order to maintain the image in focus on the sensor over the wide range of scanning, a pair of relay lenses is inserted in the optical path between the interferometer and the light detector.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1 is a simplified schematic representation of prior-art apparatus used in vertical scanning interferometry.

FIG. 2 is a schematic elevational representation of a motorized vertical scanning mechanism according to the invention where the rotation of a motor is converted to linear motion by using a lever system.

FIG. 5 is a schematic elevational representation of a fourth embodiment of the motorized vertical scanning mechanism of the invention wherein the motion of the objective is produced by a direct coupling of the motor with the objective.

FIG. 6 is a schematic elevational representation of a fifth embodiment of the motorized vertical scanning mechanism of the invention wherein the motion of the objective is produced by a rack and pinion connection between the motor and the objective.

DESCRIPTION OF THE PREFERRED EMBODIMENTS OF THE INVENTION

Figure 3:
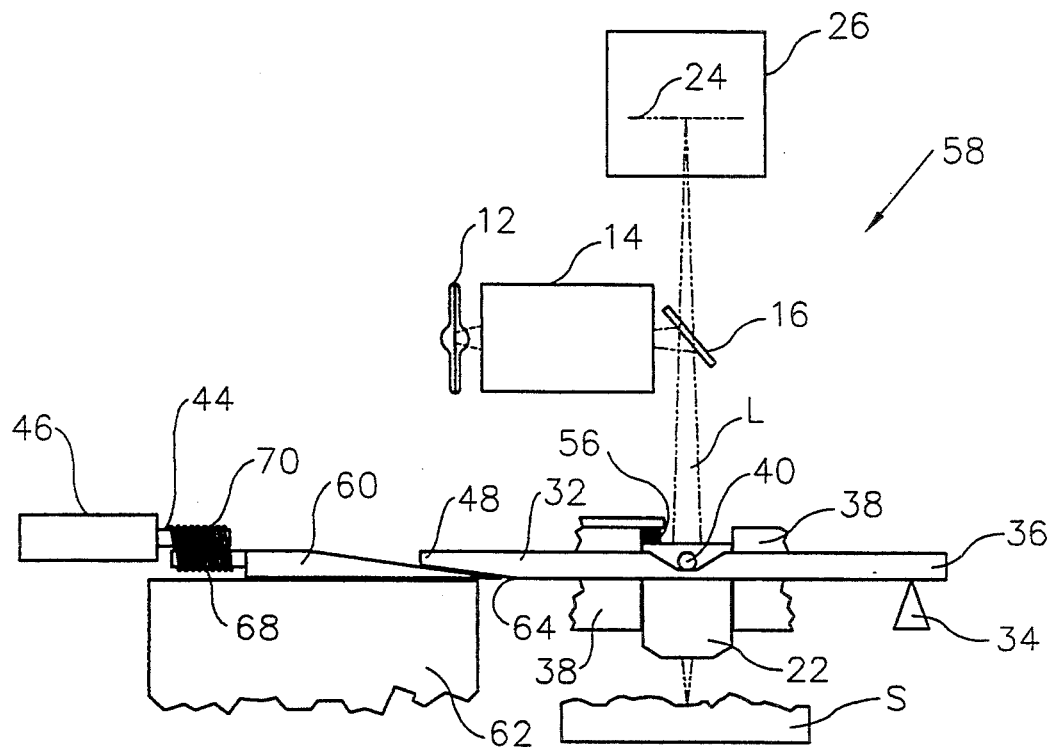
FIG. 3 is a schematic elevational representation of another embodiment of the motorized vertical scanning mechanism of the invention wherein the motion of the objective is produced by a wedge acting on the lever system shown in FIG. 2.

The present invention consists of several main concepts that differentiate it from the prior art. The first and most critical one relates to the use of a motorized mechanism to effect the vertical motion of the optics (or of the sample stage) in an interferometer to provide a range of motion many times greater than available by utilizing piezoelectric transducers. The description of the mechanism in this disclosure is based on a system wherein the vertical scanning motion is provided to the optics of the instrument, but it is understood that the same principles can be used in a system where the vertical movement is applied to the sample. Another important improvement over prior-art vertical scanners is the introduction of two lenses in the optical path of the instrument to relay an image (one lens collimates the light and the other refocuses it, an effect sometimes referred to as an optical trombone), which makes it possible to keep the sample in focus at the detector over the wide range of scanning provided by the motorized mechanism. Both concepts are necessarily related because a wide-range scanner in a conventional, finite-conjugate optical system would cause the image to fall out of focus as the distance between the detector and the objective (or the sample) is changed. Therefore, a system must be provided to keep the focal length constant regardless of vertical movement of the objective or of the sample.

It is noted that the embodiments of the present invention are described with reference to x, y and z orthogonal coordinates wherein x and y define a horizontal plane and z defines a vertical direction, but it is obvious that the structure and operation of the features detailed herein could be rotated in any direction with equivalent results. It is also understood that the sizes of the various components shown in the drawings are not drawn to relative scale because of the very small dimensions of some features in comparison to others illustrated in the figures; rather, they are represented only schematically for illustration.

Referring to the drawings, wherein like parts are designated throughout with like numerals and symbols, FIG. 2 illustrates in schematic view the basic mode of operation and the structure of a motorized vertical scanning mechanism 30 according to this invention. The apparatus comprises the same interferometer components illustrated in FIG. 1, represented schematically by a white-light source 12, an illuminator 14, a beam splitter 16, a camera detector array 24, a camera 26 and a test sample S, all fixed with respect to the supporting structure of the instrument. The optical microscope objective 22, upon which vertical scanning is effected, is adapted for vertical movement to focus the image of the test surface on the detector array 24. The objective 22 is supported by a substantially-horizontal tilt arm 32 (shown with its main axis in the x direction) that is hinged on a fixed fulcrum 34 at one end 36 thereof. The objective 22 is connected to guiding means that prevent any motion other than vertically along the longitudinal axis of the objective within the optical path of the light beam L. An example of such guiding means are vertical guide rails 38 and two rounded pins 40 radially attached to the objective (horizontally in the y direction) and resting on a flat inset 42 in the tilt arm 32 on each of opposite sides of the objective. Thus, the coupling of the objective 22 to the tilt arm 32 occurs only by means of the points of contact (two collinear lines) where the two pins 40 tangentially meet the flat surface of the inset 42. Such a tangential contact configuration minimizes the effect of lateral components of forces exerted on the objective 22 by the vertical movement of the tilt arm 32 while allowing the objective's free vertical (and axial) translation.

A fixedly secured gear motor 46 having a finely-threaded rotating output-shaft 44 is coupled to the tilt arm 32 substantially at the other end 48 thereof through a threaded nut 50 which is hingedly coupled to the tilt arm in rotationally-fixed disposition. This hinge connection is preferably accomplished by means that allow some movement of the nut 50 with respect to the tilt arm 32 as the arm is raised or lowered. This prevents binding of the hinge connection which may otherwise occur when relatively large translations are performed. As illustrated in FIG. 2, one way to achieve such free coupling is by having two radial rounded pins 54 rigidly attached to opposite sides of an otherwise free-standing nut 50 and by having such pins engaged by horizontally-elongated receiving slots 55 in the tilt arm 32, wherein the slots 55 have a width substantially equal to the diameter of the pins and a length sufficiently large to accommodate the expected lateral translation of the end 48 of the tilt arm during operation.

As a result of this configuration, it is readily apparent that a rotation of the output-shaft 44 causes the nut 50 to be either raised or lowered along the length of the shaft, depending on the direction of rotation, which in turn causes the tilt arm 32 to pivot upward or downward around the fulcrum 34 and concurrently to either raise or lower the objective 22, providing vertical translation thereof. Based on simple principles of geometry, it is apparent that the vertical translation of the objective 22 with respect to the vertical motion of the nut 50 can be linearly reduced or increased by either reducing or increasing its distance from the fulcrum 34, respectively, thus providing a simple means for effecting very fine movements. Similarly, by utilizing threads 52 with very small pitch in the shaft 44 and nut 50, the vertical motion of the nut 50 corresponding to each turn of the shaft 44 can be reduced to a very small distance, as required to produce the very fine vertical movements needed for vertical scanning interferometry. In order to improve the mechanical response of the objective during downward translation, it may be spring-loaded with downward-biased means 56, such as a spring mechanism pushing against the housing of the objective 22.

In an equivalent embodiment 58 of the concept of the invention illustrated in the schematic of FIG. 3, the lever arrangement for the vertical motion of the tilt arm 32 may be achieved by means of a very-narrow-angle wedge 60 slidably mounted on a support structure 62 for slidable engagement of a conforming surface 64 in the lower side of the tilt arm 32, such that the arm is lifted or lowered as the wedge is pushed under or retracted from the end 48 of the tilt arm. As shown in the figure, the position of the wedge 60 may be controlled by a continuous gear mechanism 68 coupled to a rotating worm-screw 70 attached to or integral with the shaft 44 of a motor 46. The motor 46, which is rigidly attached to the frame of the apparatus in fixed relationship to the fulcrum 34, may be positioned either in parallel to the longitudinal axis of the wedge 60 (as illustrated in the drawing) or at some angle with appropriate coupling gears to provide the desired translational range of motion to the wedge.

Figure 4:
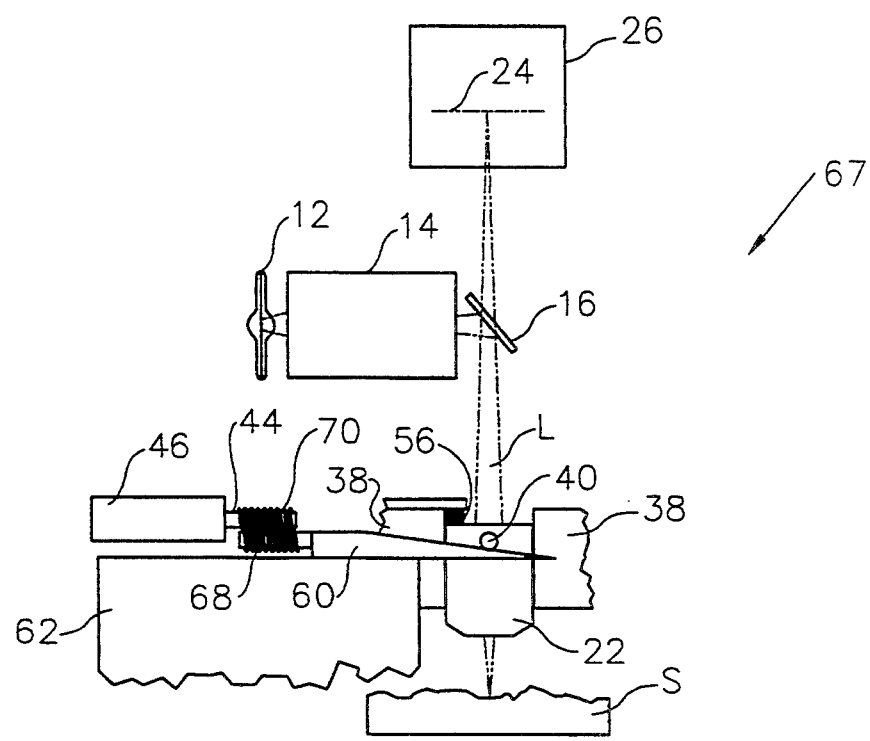
FIG. 4 is a schematic elevational representation of a third embodiment of the motorized vertical scanning mechanism of the invention wherein the motion of the objective is produced by a wedge acting directly on the objective.

A third embodiment 67 of the motorized scanning mechanism of the invention is shown in FIG. 4, wherein the wedge 60 is adapted for slidable engagement directly with the objective 22. Thus, as the wedge 60 is moved horizontally along its support structure 62 by the rotation of the motor 46, the objective 22 is translated up or down, depending of the direction of rotation, and the optical path distance to the reference arm is varied. In yet another embodiment 69 of the invention illustrated schematically in FIG. 5, the worm screw 70 is threadedly coupled to a nut fixed to a bracket 71 rigidly connected to the objective 22, so that the rotation of the motor 46 results in a direct vertical translation of the objective. Obviously, gear reducers in the motor in combination with the pitch of the threads of the worm screw 70 can be selected to achieve the desired speed of vertical translation of the objective 22. FIG. 6 illustrates an embodiment 73 of the invention where the shaft 44 of the motor 46 is coupled to the objective through a rack and pinion mechanism 75 adapted to translate the motor rotation into a vertical motion of the objective. It is noted that these illustrations are examples of various ways of implementing a motorized scanning system in interferometric apparatus and are not intended to be limiting the scope of the invention encompassed by this disclosure.

Because of the greatly expanded range of vertical scanning provided by the motorized mechanism of the present invention, it is helpful to modify the optics of conventional interferometers to retain optimal focus conditions during scanning. Such a provision becomes necessary if the range of scanning is sufficiently large, such as for ranges greater than 125 $\mu m$.

Figure 7:
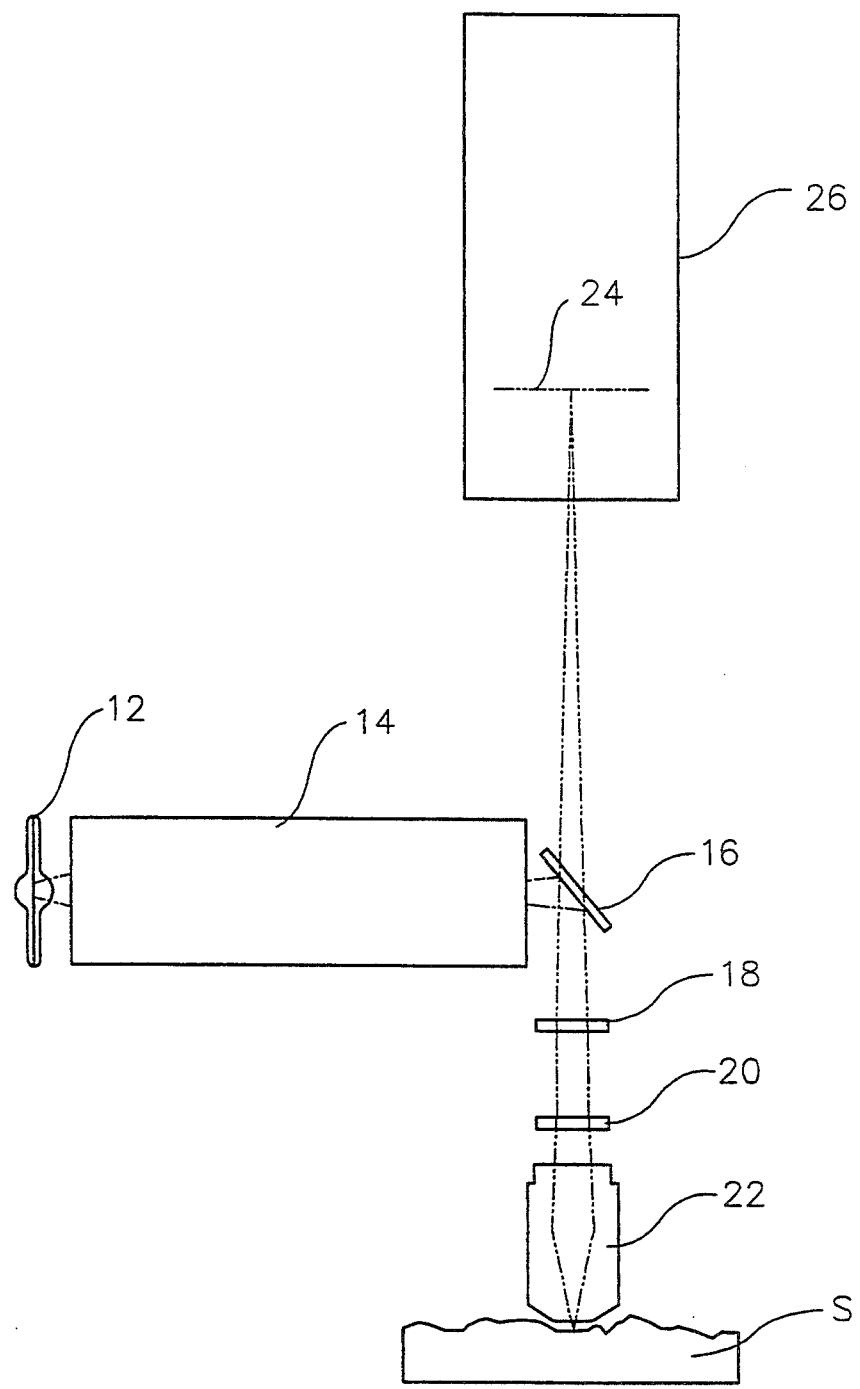
FIG. 7 is a simplified schematic representation of apparatus used in vertical scanning interferometry including relay lenses in the optical path of the light beam.

Thus, as illustrated in the schematic drawing of FIG. 7, a pair of relay lenses 18 and 20 is inserted in the optical path of the light beam L between the beam splitter 16 and the microscope objective 22. The position of the upper lens 18 is fixed in relation to the beam splitter 16 and sensor array 24 while the lower lens 20 is fixed with respect to the objective 22 (and the interference optics incorporated within it), thus collimating the light between the two lenses and forming an optical trombone that ensures the maintenance of a focused image during scanning. By producing collimated light in the path between lenses 18 and 20, their separation does not affect the focal length of the system. Obviously, as the microscope 22 is scanned vertically, the distance between lenses 18 and 20 varies by an amount equal to the displacement of the objective, but the focus of the image on the sensor array 24 remains unchanged because of the optical trombone effect produced by the relay lenses.

Figure 8:
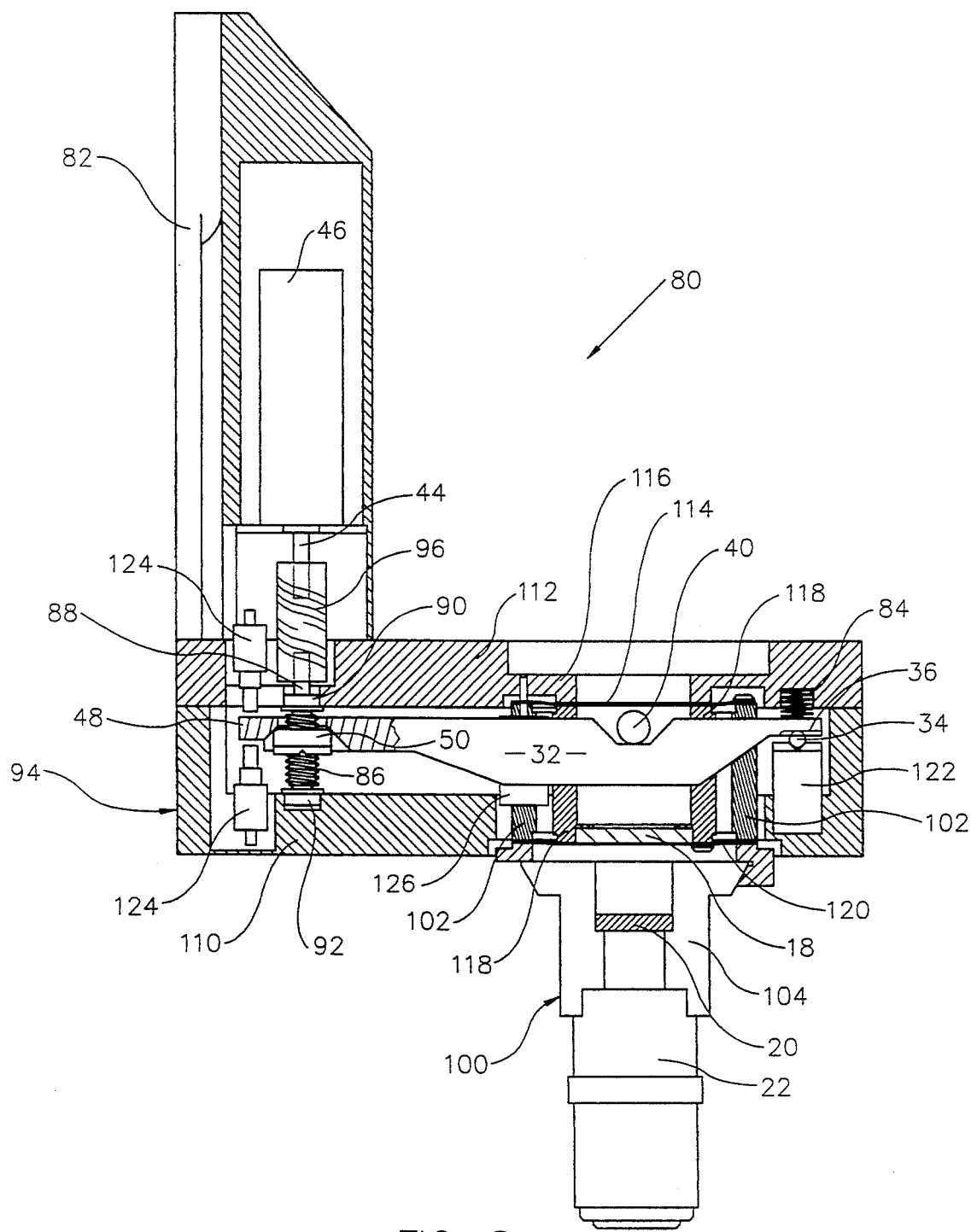
FIG. 8 is a partially-sectioned elevational view of the optical scanning assembly in the preferred embodiment of the present invention.
Figure 10:
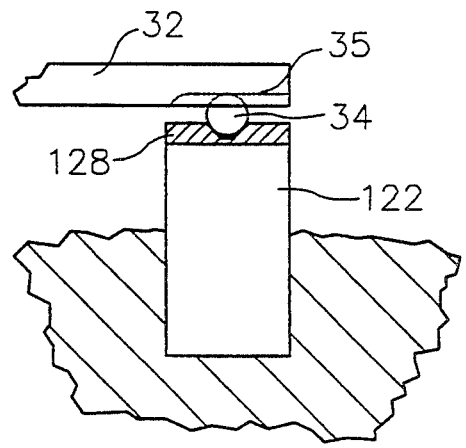
FIG. 10 is an enlarged schematic view of a PZT tube adapted to operate on the tilt arm of the invention.
Figure 11:
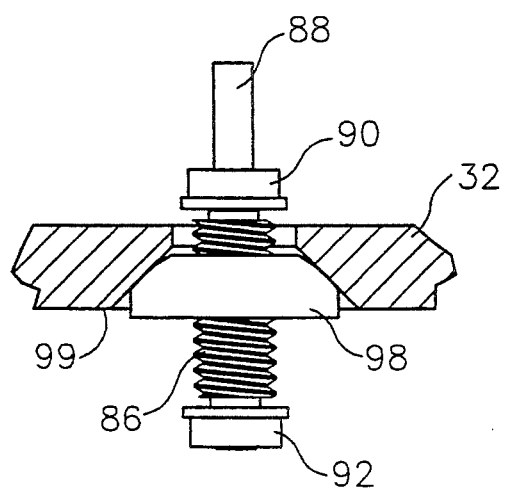
FIG. 11 is an enlarged schematic view of the swivel connector utilized to couple the nut to the tilt arm in the preferred embodiment of the invention.

Thus, the combined features of this invention make it possible to scan vertically over a range that is practically unlimited within the useful scope of interferometry. FIG. 8 illustrates a preferred method of implementing the configuration shown in FIGS. 2 and 7 in a commercial instrument. An optical scanning assembly 80 is slidably mounted on a fixed support frame (nor shown) by means of a vertical slide 82 such that the assembly can be moved vertically to focus the image of a sample S positioned below the assembly on a sensor array 24 positioned above it (both seen in FIGS. 2 and 7). The assembly 80 comprises a tilt arm 32, upper and lower lenses 18 and 20, and a microscope objective 22 that incorporates Mirau interferometry optics. The tilt arm 32 is hinged at one end 36 on a fulcrum 34. At the other end 48, the tilt arm 32 is coupled to a nut 50 threadedly mounted on a continuous lead screw 86 in a shaft 88 rotatably journaled between two bearings 90 and 92 housed in the supporting structure 94 of the scanning assembly. The shaft 88 is coupled to the vertical motor shaft 44 of a DC motor 46 rigidly attached to the structure 94. A flexible coupling 96 is preferably used to eliminate stresses and vibrations that may result from misalignment of the shafts 44 and 88. As better illustrated in the detailed view of FIG. 11, in the preferred embodiment of the invention the nut 50 consists of a rounded swivel connector 98 slidably fitted in a receiving housing 99 in the tilt arm, such that the axis of the nut is free to tilt slightly with respect to the tilt arm as the arm is raised or lowered from a perfectly horizontal position. Retaining means (not shown in the figures) are attached to the connector 98 to prevent its separation from the tilt arm and its axial rotation with respect to the lead screw 86. In order to prevent binding of the lead screw as the tilt arm 32 is raised or lowered with the swivel connector 98, the inset 35 in which the fulcrum 34 is fitted is adapted to allow some relative longitudinal movement between the two (see FIG. 10), so that the tilt arm may shift longitudinally at its end 36 as the opposite end 48 is moved up or down with the connector. Thus, the form of coupling between the tilt arm and the lead screw allows minor shifts in the position of the tilt arm 32 to accommodate vertical movements of the end 48 of the tilt arm as it is translated vertically by the rotation of the motor shaft 44. As in the schematic example of FIG. 2, the tilt arm 32 provides vertical scanning motion to two pins 40 resting on two flat insets 42 on opposite sides of the tilt arm. As explained in detail below, the pins 40 are rigidly attached to an objective assembly 100 which is thus adapted to move up and down with the tilt arm 32 in response to a rotation of the motor shaft 44.

Figure 12:
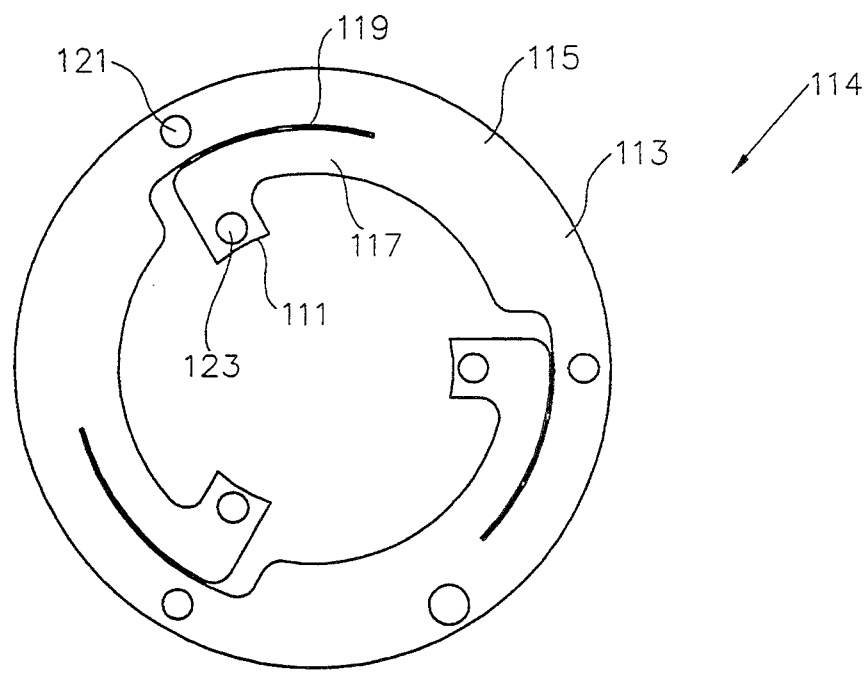
FIG. 12 is an enlarged plan view of a vertically-compliant, laterally-stiff flexure used to connect the sleeve and inner tube of the invention.

As seen in FIG. 8, the objective assembly 100 comprises a vertical sleeve 102 on which the two pins 40 are radially mounted, an objective holder 104 (normally removable) rigidly attached to the sleeve 102, and an objective 22 removably mounted on the objective holder 104, so that different kinds of objectives may be installed as needed. As better understood from the exploded view of FIG. 9, the sleeve 102 and the objective holder 104 are mounted in the optical scanning assembly 80 through a series of conforming openings 106 and 108 in the tilt arm 32 and in the lower component 110 of the supporting structure 94, respectively, which permit the vertical translation of the assembly with respect to the fixed position of the supporting structure. The lower relay lens 20 is mounted in the objective holder 104, so as to be movable therewith at a fixed distance from the objective 22. Finally, the top end of the sleeve 102 is elastically coupled to the upper component 112 of the supporting structure 94 by means of an annular flexure 114 adapted to permit vertical (that is, axial) displacement of the sleeve 102 without allowing any lateral movement. As shown in FIG. 12, the flexure 114 consists essentially of an annular structure made of resilient material, such as steel, cut uniformly at equidistant intervals to form substantially two concentric rings connected by uncut portions 113 of the annular structure. Thus, by the substantially circular cuts 119 in the structure, an outer ring 115 is defined as a separate functional member from an inner ring 117. The inner ring is provided with radial tabs 11 and are outer and inner perforations 121 and 123, respectively, are provided to attach each ring to separate structures to form a connection therebetween that is stiff along the plane of the flexure 114 but flexible in a direction normal to it. Therefore, by securing the outer ring 115 of the circular flexure 114 to the top of the sleeve 102 and attaching the tabs 11 in the inner ring 117 of the flexure to a collar 116 protruding downward inside the upper component 112 of the supporting structure of the aparatus, the sleeve may only move up or down as the flexure 114 flexes about its relaxed position. The result is a vertically-compliant but laterally-stiff connection.

In what constitutes another important inventive feature of this disclosure, the upper relay lens 18 is mounted inside an inner tube 118 that is attached to the collar 116 through the inner ring of the upper circular flexure 114, the inner tube being inside the sleeve 102 and coaxial therewith. Thus, the inner tube 118 is rigidly fixed to the supporting structure 94 of the scanning assembly, while the sleeve 102, concentrically mounted around the tube by virtue of its attachment to the outer ring of the upper flexure 114, is flexibly movable along the vertical axis of both components. Therefore, the upper lens 18 remains fixed with respect to the supporting structure 94 while the sleeve 102 is translated during vertical scanning. In order to maintain perfect coaxial alignment of the sleeve 102 and the inner tube 118 during scanning, a lower circular flexure 120 identical to the upper flexure 114 is used to also flexibly couple the bottom ends of the sleeve and inner tube in a manner equivalent to the one described for the top ends thereof. Specifically, the outer ring of the flexure 120 is sandwiched between the sleeve 102 and the objective holder 104, while the inner ring of the flexure is fastened to the inner tube 118 and remains fixed as the sleeve moves vertically. As the objective assembly 100 is moved vertically during scanning, the two flexures 14 and 120, which are identical and therefore exhibit the same mechanical characteristics, move in perfect alignment with one another and ensure a correspondingly-stable coaxial alignment of the inner tube 118 and sleeve 102. Note that the vertical component of the motion of the tilt arm 32 is transmitted to the objective assembly 100 through the points of contact between the pins 40 and the insets 42. When the tilt arm is raised, the insets push the pins upwards against the downward pressure exerted by the flexures 114 and 120; when the tilt arm is lowered, the upward support pressure exerted by the insets 42 on the pins 40 is released and the objective assembly 100 is allowed to drop either by gravity or with the aid of a downward force exerted by the flexures. Preferably, the parts are assembled in such a way that the flexures 114 and 120 are always biased downward within the range of operation of the scanning mechanism.

Inasmuch as the position of the lower lens 20 is fixed within the objective holder 104 (or equivalent apparatus) that travels with the sleeve 102, the distance between lenses 18 and 20 varies according to the translation of the objective assembly 100 during scanning, but the focal length of the objective remains unchanged, thus keeping the image of the sample focused on the sensor array or other detecting device of the apparatus. This feature is particularly important for scanning over the wide ranges of operation (500 $\mu$m or more) that the motorized scanning mechanism of this invention affords.

In the preferred embodiment of the invention described in this disclosure, a DC reversible motor rotating at approximately 13,000 rpm under no-load conditions at the rated voltage of 12 volts was utilized, such as sold by Micro Mo of St. Petersburg, Fla. A 3,101 to 1 reduction-ratio gear incorporated into the motor provides a motor shaft nominal speed of about 4.2 rpm, which can be further decreased by reducing the operating voltage applied to the motor. At 0.4 volts, the motor output shaft 44 rotates at approximately 7.08 revolutions per second, which is a suitable speed to produce fast and precise movement of the tilt arm 32. By utilizing a lead screw 86 with a pitch of about 1.06 mm per revolution, the nut 50 and correspondingly the part of the tilt arm attached to it may be made to travel at a speed of about 2.42 $\mu$m per second at approximately 0.4 volts. Using a tilt arm approximately 9.6 cm long between the point of contact with the fulcrum 34 and the axis of the nut 50, and by positioning the axis of the pins 40 about 3.2 cm from the fulcrum (a 3 to 1 lever arm), a vertical translation of about 0.8 $\mu$m per second of the objective is produced, which is well within the desirable speed for vertical scanning.

Figure 13:
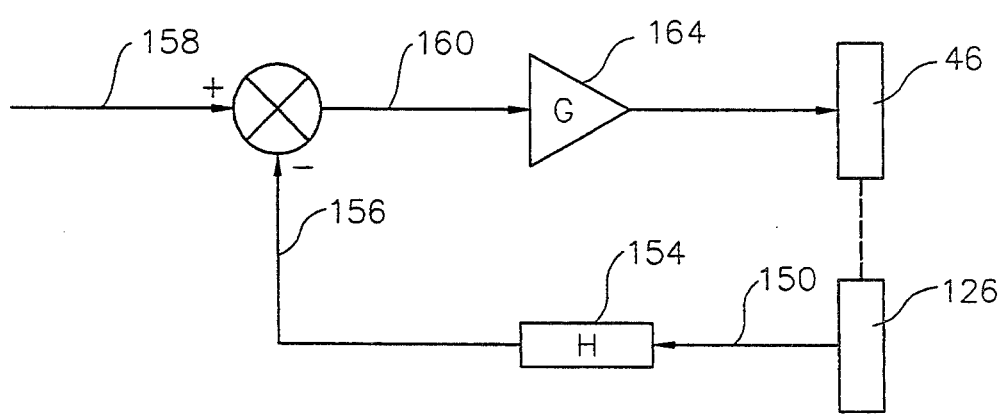
FIG. 13 is a schematic representation of the closed-loop feedback control circuit for the motorized mechanism of the invention.

Because of the linear relationship between the vertical motion of the tilt arm 32 and that of the pins 40, the scanning speed of translation remains linear so long as the motor is operated at constant speed. This is achieved by a feedback control circuit that utilizes vertical position signals generated by an LVDT position-sensing device 126 adapted to measure the vertical elevation of the movable sleeve 102 with respect to the fixed structure 94 of the optical scanning assembly 80. As illustrated schematically in the diagram of FIG. 13, the position output signal 150 generated continuously by an LVDT sensor 126 is fed to feedback circuitry 154 of predetermined gain H and the output 156 of the feedback circuit is summed with a ramp signal 158 to produce an error signal 160. The error signal is then amplified in an amplifier 164 with predetermined gain G and used to drive the motor 46 of the scanning mechanism. Because of the closed-loop feedback configuration of this control system, the linearity of the speed of the motor's output is ensured by the linear characteristics of the ramp signal used to drive the circuit, thereby ensuring that the motion of the sleeve 102 and of the objective 22 coupled to it is perfectly linear in time (i.e., at constant speed), so that sampling may be carried out accurately at predetermined time intervals (corresponding to predetermined z-direction coordinates at which fringe patterns are measured). This is important because data collection during scanning (which is carried out in snap-shot fashion) needs to take place at precisely-known positions in order to generate useful light-intensity data. Therefore, to the extent that the speed of motion of the objective deviates from linearity, the error 162 generated by the control circuit is used to increase or decrease the voltage applied to the motor 46, according to conventional feedback control techniques, to reduce the error to zero.

In an open-loop configuration, the motion of the motor 46 could be controlled by a control circuit programmed to generate a voltage input to the motor designed to produce motion at a constant speed. Of course, such a circuit would require calibration for the particular motor controlled by the circuit. Alternatively, the motor could be operated without control, sampling the detector-array output at predetermined time intervals while recording corresponding scanning positions. The detector-array output, or the test-sample height data derived therefrom, could then be processed to produce a corrected output corresponding to a constant-speed translation.

In practice, it is convenient to perform vertical scanning downward from an initial reference position. With the motor and mechanical configuration described above, a complete scan over about 500 $\mu$m can be accomplished in about 625 seconds operating at about 0.4 volts; the objective is then returned quickly (in about 20 seconds) to the initial reference position by resetting the ramp input to zero and allowing the servo system to drive the motor back to its initial position. Obviously, the speed at which continuous vertical scanning can be carried out depends upon the speed at which the detector can be sampled by the electronics of the system. As those skilled in the art understand, different scanning speeds may be provided for different degrees of desired accuracy. Also, appropriate control inputs may be required to correct backlash and other forms of inertial effects inherent in the dynamics of all mechanical systems. Finally, limit switches 124 may be installed in the system to ensure stoppage of the motor when the tilt arm 32 reaches predetermined points in its intended vertical travel.

Figure 9:
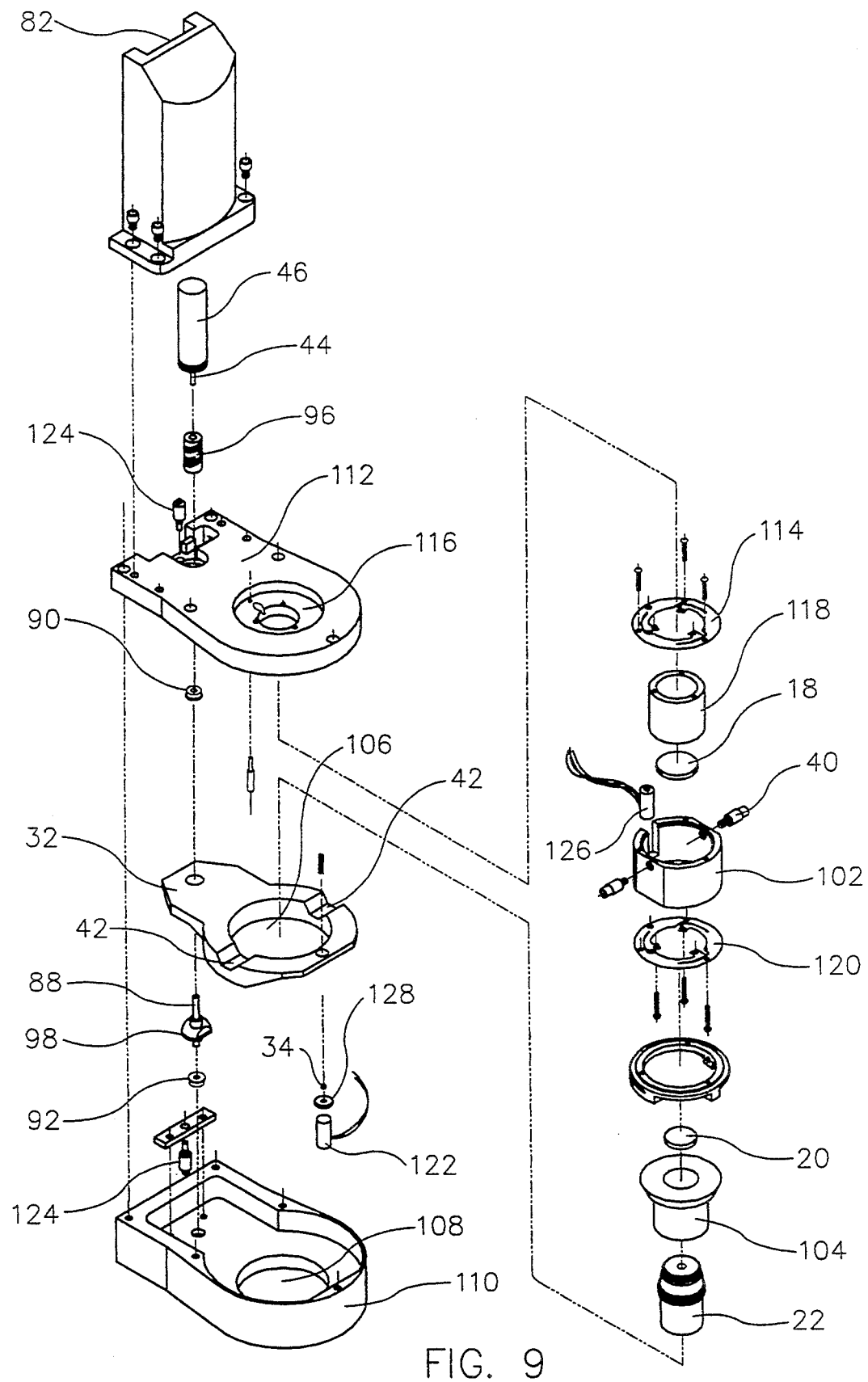
FIG. 9 is an exploded partial view of the components of the assembly shown in FIG. 8.

As an additional feature of the apparatus of the invention, a piezoelectric transducer may be combined in series with the motorized mechanism for use during phase-shifting measurements which, as well understood by those skilled in the art, do not require a wide range of scanning (only in the order of a few wavelengths, or less than 1 $\mu$m). In fact, the fast and precise response of PZT transducers over such short distances is best suited for phase-shifting measurements. As seen in FIGS. 8 and 9 and illustrated in more detail in FIG. 10, this feature is implemented in the preferred embodiment by installing a PZT tube 122 directly under the fulcrum 34

(shown as a ball engaged by a conforming inset in the tilt arm 32), wherein the PZT transducer is adapted to raise the position of the fulcrum ball when energized. A metallic support 128 is provided attached to the ceramic piezoelectric element to hold the ball in a fixed horizontal position. Also, a downward-biased spring 84 is preferably utilized to ensures the stability of the pivot connection and to preload the piezoelectric element for improved scanning response, as well understood in the art. Thus, vertical scanning for phase shifting may be performed by varying the elevation of the fulcrum (using the connection between the nut 50 and the tilt arm as the pivot point) through the action of the PZT tube, which in turn affects linearly the vertical position of the objective assembly, according to well-known principles of operation. This combination of a motorized scanning mechanism with a conventional PZT mechanism enables a user to perform both white-light vertical scanning and phase shifting with the same instrument, so that a test sample may be profiled for both steep and fine height information. In addition, because of the large range of scanning provided by the motorized mechanism, it can also be used to provide the initial focusing translation to position the objective prior to performing phase-shifting measurements. The control system for phase shifting may be accomplished by any conventional circuit and is independent of the closed-loop feedback control mechanism described above for vertical scanning.

It is important to note that the structural members shown in FIGS. 8 and 9 consist of high-precision, small components that cannot be properly handled or adjusted without the use of precision instrumentation. In addition, depending on the particular application intended for the apparatus of the invention, other hardware essential to the functioning of the optical scanning assembly may also be housed within the same support structure. Therefore, all parts essential to the invention must be operable within minute tolerances in the crowded environment of the optical scanning assembly. Note that the concepts of the invention may be easily integrated by those skilled in the art with automated systems normally used to operate scanning microscopes.

Various changes in the details, steps and materials that have been described may be made by those skilled in the art within the principles and scope of the invention herein illustrated and defined in the appended claims. For example, it is clear that the usefulness of the concept of providing vertical translation by means of a mechanized lever system can be implemented in many equivalent manners and is not limited to the vertical lead-screw/nut combination and the horizontal worm-screw/wedge combination described here. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. In a device adapted to execute white-light vertical-scanning interferometric measurements at multiple distances between a test sample and a reference arm aligned in an optical path to a light-intensity sensor, wherein a scanning means is used to effect a relative translation between the sample and the reference arm to achieve said multiple distances at which light-intensity outputs are produced and wherein said light-intensity outputs are used to calculate a surface-height output corresponding to the test sample, a mechanical scanning means that comprises:

(a) a motor fixedly connected to a support frame for said device;
    (b) drive means for coupling an output shaft of said motor to one of said sample or reference arm, such that a motion of said shaft is translated into a relative motion between the sample and the reference arm within said optical path; and
    (c) a pair of lenses disposed in said optical path, wherein one of the lenses is fixed with respect to said sample and the other of the lenses is fixed with respect to said reference arm.

2. The mechanical scanning means of claim 1, wherein said drive means consists of a lever driven by said output shaft and hingedly connected to said one of the sample or reference arm.

3. The mechanical scanning means of claim 1, wherein said drive means consists of a wedge driven by said output shaft and adapted to slidably engage said one of the sample or reference arm.

4. The mechanical scanning means of claim 1, wherein said drive means consists of a nut rigidly attached to said one of the sample or reference arm and screwably coupled to a worm gear driven by said output shaft.

5. The mechanical scanning means of claim 1, wherein said drive means consists of a rack and pinion mechanism.

6. The mechanical scanning means of claim 1, further comprising a piezoelectric transducer adapted to produce a serial translation of one of said sample or reference arm in alignment with the other of said sample or reference arm within said optical path.

7. The mechanical scanning means of claim 1, further comprising means for controlling the motion of said shaft of the motor such that said relative motion between the test sample and the reference arm is carried out at constant speed.

8. The mechanical scanning means of claim 7, wherein said means for controlling the motion of said shaft of the motor consists of a closed-loop feedback control circuit.

9. The mechanical scanning means of claim 7, wherein said means for controlling the motion of said shaft of the motor consists of an open-loop control circuit.

10. The mechanical scanning means of claim 1, further comprising means for processing said light-intensity outputs to produce a corrected surface-height output corresponding to a constant-speed relative motion between said test sample and said reference arm.

11. In a device adapted to execute white-light vertical-scanning interferometric measurements at multiple distances between a test sample and a reference arm aligned in an optical path to a light-intensity sensor, wherein a scanning means is used to effect a relative translation between the sample and the reference arm to achieve said multiple distances at which light-intensity outputs are produced and wherein said light-intensity outputs are used to calculate a surface-height output corresponding to the test sample, a mechanical scanning means that comprises:

(a) a motor fixedly connected to a support frame for said device;

(b) drive means for coupling an output shaft of said motor to one of said sample or reference arm, such that a motion of said shaft is translated into a relative motion between the sample and the reference arm within said optical path; and (c) a piezoelectric transducer adapted to produce a serial translation of one of said sample or reference arm in alignment with the other of said sample or reference arm within said optical path, such that said relative translation between the sample and the reference arm is a cumulative linear translation produced by said drive means and said piezoelectric transducer.

12. The mechanical scanning means of claim 11, further comprising a pair of lenses disposed in said optical path, wherein one of the lenses is fixed with respect to said sample and the other of the lenses is fixed with respect to said reference arm.

13. In a device adapted to execute interferometric measurements at multiple distances between a test sample and a reference arm in an optical microscope objective aligned in an optical path, wherein a scanning means is used to effect a relative translation between the sample and the reference arm to achieve said multiple distances, a mechanical scanning means that comprises:

(a) a lever having a movable end and having a pivot end hingedly connected to a fixed fulcrum;

(b) motorized means connected to said movable end and adapted to cause a scanning translation thereof about said fixed fulcrum; and (c) means for coupling one of said sample or reference arm to the lever, such that it is translated with said movable end of the lever in alignment with the other of said sample or reference arm and within said optical path; and (d) a pair of lenses disposed in said optical path, wherein one of the lenses is fixed with respect to said sample and the other of the lenses is fixed with respect to said objective;

wherein the other of said sample or reference arm is kept at a fixed position with respect to said fulcrum during the scanning translation of said movable end of the lever.

14. The mechanical scanning means of claim 13, wherein said motorized means consists of a gear motor having an output shaft threadedly connected to a nut attached to said movable end of the lever.

15. The mechanical scanning means of claim 14, wherein said nut is hingedly coupled to said movable end of the lever.

16. The mechanical scanning means of claim 13, wherein said motorized means consists of a gear motor having an output shaft connected to a flexible coupling, and of a nut attached to said movable end of the lever and threadedly engaged by a lead screw connected to said flexible coupling.

17. The mechanical scanning means of claim 16, wherein said nut is hingedly coupled to said movable end of the lever.

18. In a device adapted to execute interferometric measurements at multiple distances between a test sample and a reference arm in an optical microscope objective aligned in an optical path, wherein a scanning means is used to effect a relative translation between the sample and the reference arm to achieve said multiple distances, a mechanical scanning means that comprises:

(a) a lever having a movable end and having a pivot end hingedly connected to a fixed fulcrum;.

(b) motorized means connected to said movable end and adapted to cause a scanning translation thereof about said fixed fulcrum;

(c) means for coupling one of said sample or reference arm to the lever, such that it is translated with said movable end of the lever in alignment with the other of said sample or reference arm and within said optical path, wherein the other of said sample or reference arm is kept at a fixed position with respect to said fulcrum during the scanning translation of said movable end of the lever; and (d) a piezoelectric transducer adapted to produce a serial translation of one of said sample or reference arm in alignment with the other of said sample or reference arm within said optical path, such that said relative translation between the sample and the reference arm is a cumulative linear translation produced by said motorized means and said piezoelectric transducer.

19. The mechanical scanning means of claim 18, further comprising a pair of lenses disposed in said optical path, wherein one of the lenses is fixed with respect to said sample and the other of the lenses is fixed with respect to said objective.

20. The mechanical scanning means of claim 19, wherein said motorized means consists of a gear motor having an output shaft threadedly connected to a nut attached to said movable end of the lever.

21. The mechanical scanning means of claim 20, wherein said nut is hingedly coupled to said movable end of the lever.

22. The mechanical scanning means of claim 19, wherein said motorized means consists of a gear motor having an output shaft connected to a flexible coupling, and of a nut attached to said movable end of the lever and threadedly engaged by a lead screw connected to said flexible coupling.

23. The mechanical scanning means of claim 22, wherein said nut is hingedly coupled to said movable end of the lever.

24. The mechanical scanning means of claim 18, Wherein said fixed fulcrum is connected to said piezoelectric transducer so as to produce said serial translation.

25. A white-light scanning interferometer having an optical scanning assembly movable with respect to a fixed sample and a fixed detector along an optical path therebetween, wherein said optical scanning assembly comprises:

(a) a lever having a movable end and having a pivot end hingedly connected to a fixed fulcrum;

(b) motorized means connected to said movable end and adapted to cause a scanning translation thereof about said fixed fulcrum;

(c) an objective assembly coupled to said lever and containing a reference arm fixed therewithin, such that the objective assembly is translated with said movable end of the lever in alignment with said sample and within said optical path; and (d) first and second relay lenses disposed in said optical path, wherein said first lens is fixed with respect to said sample and said second lens is fixed with respect to said objective assembly;

wherein the sample is disposed at a fixed position with respect to said fulcrum during the scanning translation of said movable end of the lever.

26. The scanning interferometer of claim 25, wherein said motorized means consists of a gear motor having an output shaft threadedly connected to a nut attached to said movable end of the lever.

27. A white-light scanning interferometer having an optical scanning assembly movable with respect to a fixed sample and a fixed detector along an optical path therebetween, wherein said optical scanning assembly comprises:
   (a) a lever having a movable end and having a pivot end hingedly connected to a fixed fulcrum;
   (b) motorized means connected to said movable end and adapted to cause a scanning translation thereof about said fixed fulcrum;
   (c) an objective assembly coupled to said lever and containing a reference arm fixed therewithin, such that the objective assembly is translated with said movable end of the lever in alignment with said sample and within said optical path, wherein the sample is disposed at a fixed position with respect to said fulcrum during the scanning translation of said movable end of the lever; and
   (d) a piezoelectric transducer adapted to produce a serial translation of said sleeve in alignment with said sample within said optical path, such that a relative translation between the sample and the reference arm is a cumulative linear translation produced by said motorized means and said piezoelectric transducer.

28. The scanning interferometer of claim 27, further comprising first and second relay lenses disposed in said optical path, wherein said first lens is fixed with respect to said sample and said second lens is fixed with respect to said objective assembly.

29. The scanning interferometer of claim 28, wherein said objective assembly comprises a frame adapted to be disposed in fixed relation to said fulcrum during said scanning translation, a sleeve coupled to said lever, an objective holder rigidly attached to said sleeve, and an objective removably and rigidly attached to said objective holder; and further comprises an inner tube coaxially disposed with said sleeve, connected thereto by axially compliant and laterally stiff connecting means, and rigidly attached to said frame; wherein said first lens is fixed with respect to said tube and said second lens is fixed with respect to said objective.

30. The scanning interferometer of claim 29, wherein said axially compliant and laterally stiff connecting means consists of two parallel flexures, each flexure having an inner ring connected to an end of said inner tube and having an outer ring connected to an end of said sleeve.

31. An axially-compliant and laterally-stiff flexure for use in connecting two concentric structures so as to allow their relative axial displacement while keeping them in coaxial alignment, said flexure comprising an annular structure made of resilient material and cut uniformly at equidistant intervals substantially to form two concentric rings connected by uncut portions of the annular structure, wherein said rings are adapted for connection with said two concentric structures.

32. A method of performing white-light vertical-scanning interferometric measurements at multiple distances between a test sample and a reference arm aligned in an optical path between the sample and a light detector; wherein a pair of lenses is provided, one lens being fixed in relation to the sample and the other lens being fixed in relation to the reference arm; wherein a scanning means is used to produce a relative translation between the sample and the reference arm to obtain said multiple distances; and wherein said scanning means comprises motorized means adapted to cause a scanning translation of one of said sample or reference arm, such that it is translated with respect to the other of said sample or reference arm within said optical path; said method comprising the following steps:
   (a) directing a beam of white light along said optical path, such that said beam of white light passes through said pair of lenses;
   (b) energizing said motorized means to cause said relative translation between the test sample and the reference arm; and
   (c) sampling an output of said detector at predetermined time or translation intervals as needed to execute interferometric measurements.

33. The method of claim 32, further comprising the step of controlling the motion of said motorized means such that said relative translation between the test sample and the reference arm is carried out at constant speed.

34. The method of claim 33, wherein said step of controlling the motion of said motorized means is accomplished by means of a closed-loop feedback control circuit.

35. The method of claim 33, wherein said step of controlling the motion of said motorized means is accomplished by means of an open-loop control circuit.

36. The method of claim 32, further comprising the step of processing said output of the detector to produce a corrected output corresponding to a constant-speed translation.

* * * * *